(12) United States Patent
Taylor et al.

(10) Patent No.: US 6,216,737 B1
(45) Date of Patent: Apr. 17, 2001

(54) FLANGED THREE-WAY UNIVERSAL BUTTERFLY VALVE

(75) Inventors: John M. Taylor, Jonesboro, AR (US); William Geers, Elkhart, IN (US)

(73) Assignee: Nibco Inc., Elkhart, IN (US)

( * ) Notice: Subject to any disclaimer, the term of this patent is extended or adjusted under 35 U.S.C. 154(b) by 0 days.

(21) Appl. No.: 09/566,005

(22) Filed: May 5, 2000

(51) Int. Cl.[7] ........................................ F16K 11/22
(52) U.S. Cl. ........................ 137/875; 137/271; 137/637
(58) Field of Search .................................. 137/269, 271, 137/862, 875, 637, 637.1; 251/289

(56) References Cited

U.S. PATENT DOCUMENTS

| | | |
|---|---|---|
| 1,332,000 | 2/1920 | Pfau . |
| 2,383,861 | 8/1945 | Hopkins . |
| 3,331,394 * | 7/1967 | Hefler et al. .................. 137/875 |
| 4,156,439 | 5/1979 | Jeffries et al. . |
| 4,295,491 | 10/1981 | Galloway . |
| 4,411,405 | 10/1983 | Barbe . |
| 4,556,192 | 12/1985 | Ramisch . |
| 4,585,032 * | 4/1986 | Lingen .................. 137/862 |
| 4,774,977 | 10/1988 | Cohen . |
| 4,828,183 | 5/1989 | Fink, Jr. . |
| 5,203,539 | 4/1993 | Stary . |
| 5,205,323 | 4/1993 | Baker . |
| 5,553,830 | 9/1996 | Stary . |
| 5,562,116 | 10/1996 | Henwood . |
| 5,704,398 * | 1/1998 | Baker .................. 137/862 |
| 5,711,510 | 1/1998 | Stary . |
| 5,908,047 | 6/1999 | Nakamura et al. . |
| 5,911,243 | 6/1999 | Cohen . |

* cited by examiner

*Primary Examiner*—John Fox
(74) *Attorney, Agent, or Firm*—Price, Heneveld, Cooper, DeWitt & Litton

(57) ABSTRACT

A valve housing has three ports with butterfly valves mounted in two of the ports with stems coupled to the valve disks and extending through opposite sides of the housing. A linkage couples the valve stems together at one side of the housing, while an actuator is coupled to at least one of the valve stems on the opposite side of the housing. The linkage and control mechanism can be reversed such that valves can be mounted in an installation either as a left hand or a right hand valve.

21 Claims, 2 Drawing Sheets

FLANGED THREE-WAY UNIVERSAL BUTTERFLY VALVE

BACKGROUND OF THE INVENTION

The present invention relates to improvements to a flanged three-way butterfly valve.

Flanged butterfly valves are frequently employed to replace ball or gate valves in a variety of applications, such as in HVAC systems, hot and cold domestic water systems, compressed air and hydrocarbon systems, vacuum systems, and other commercial applications. Butterfly valves have the advantage of providing a lighter weight valve with easier operation. They also provide a positive shut-off and high pressure operation while having a compact design. By providing flanges on the housing of a butterfly valve, they can be employed in a system to replace existing gate and ball valves having such connections to the system. Although three-way butterfly valves have been proposed, none provide universal application by allowing a left or right hand installation. That is, the valve actuators and linkage between a pair of such valves in a housing have been located on the same side, thereby requiring separate left hand and right hand designs for such valves.

Accordingly, there exists a need for a universal three-way flanged butterfly valve which can control the flow of a fluid from one source selectively to two different destinations or throttle the flow rate between the two.

SUMMARY OF THE INVENTION

The valve design of the present invention provides such construction by providing a valve housing with three ports having flanges and butterfly valves mounted in two of the ports. Valve stems are coupled to each of the valve disks associated with the butterfly valves and extend through opposite sides of the housing. A linkage couples the keyed valve stems together on one side of the housing, while an actuator is coupled to at least one of the valve stems on the opposite side of the housing. The linkage and control mechanism can be reversed such that valves can be mounted in an installation either as a left hand or a right hand valve.

Such construction provides a compact, lightweight and relatively inexpensive valve assembly which reduces the required inventory for service companies when replacing three-way valves as well as providing the advantage of butterfly valves over existing gate and ball valves. These and other features, objects and advantages of the present invention will become apparent upon reading the following description thereof together with reference to the accompanying drawings.

DETAILED DESCRIPTION OF THE PREFERRED EMBODIMENT

Figure 1:
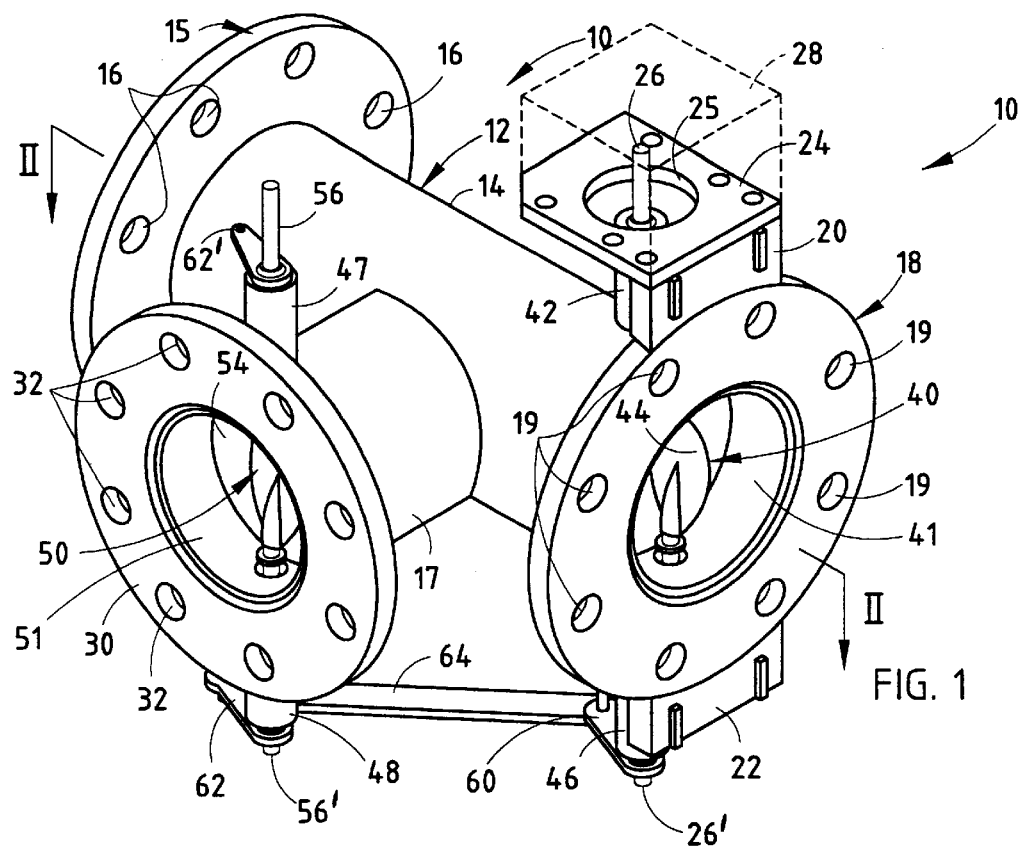
FIG. 1 is a perspective view of a three-way flanged butterfly valve of the present invention.

Initially, it should be noted that the valve of the present invention can be mounted in any three port flow system and the identification of the valve ports as input/output, first, second or third, left or right, is used merely for convenience inasmuch as the installation of the valve in a particular system will determine its function. Additionally, although the valve disks are shown mounted in a specific two of the three ports in the drawings, they may be mounted in a pair of different ports.

Referring initially to FIG. 1, there is shown a three-way flanged butterfly valve 10 of the present invention, which includes a generally T-shaped valve housing 12 having a central cylindrical body 14 terminating at one end in a circular mounting flange 15 having a plurality of equally spaced mounting apertures 16 formed through the periphery of the flange. On an end opposite flange 15, body 14 includes a second flange 18 with a plurality of mounting apertures 19 spaced equally therearound. Flange 18 integrally includes generally rectangular mounting bosses 20 (on the top side as seen in FIG. 1) and 22 (on the bottom side as seen in FIG. 1) to receive a mounting plate 24 for mounting a valve actuator 28 to housing 12. The actuator can be a conventional actuator which allows either a lever control to be mounted thereto, a wheel control through a worm gear drive, or a motor mount which can be employed to electrically actuate the valve 10. For such purpose, plate 24 includes a central aperture 25 through which a keyed valve stem 26 for one of the butterfly valves, as discussed below, extends.

Valve housing 12 also includes a cylindrical body 17 extending orthogonal to body 14 and communicating therewith and terminating in a mounting flange 30 having a plurality of mounting apertures 32 spaced equally therearound. The valve housing 12 may be made of any suitable material typically employed for such valves, including ductile iron, cast iron, or the like, and is typically integrally formed by casting. The housing 12 includes a pair of butterfly valve assemblies 40 and 50, respectively, mounted to open ports 41 and 51 surrounding flanges 18 and 30, respectively. Although the housing of the embodiment shown is generally T-shaped, it is understood that the invention can be incorporated in other configurations such as a Y-shaped housing.

Figure 2:
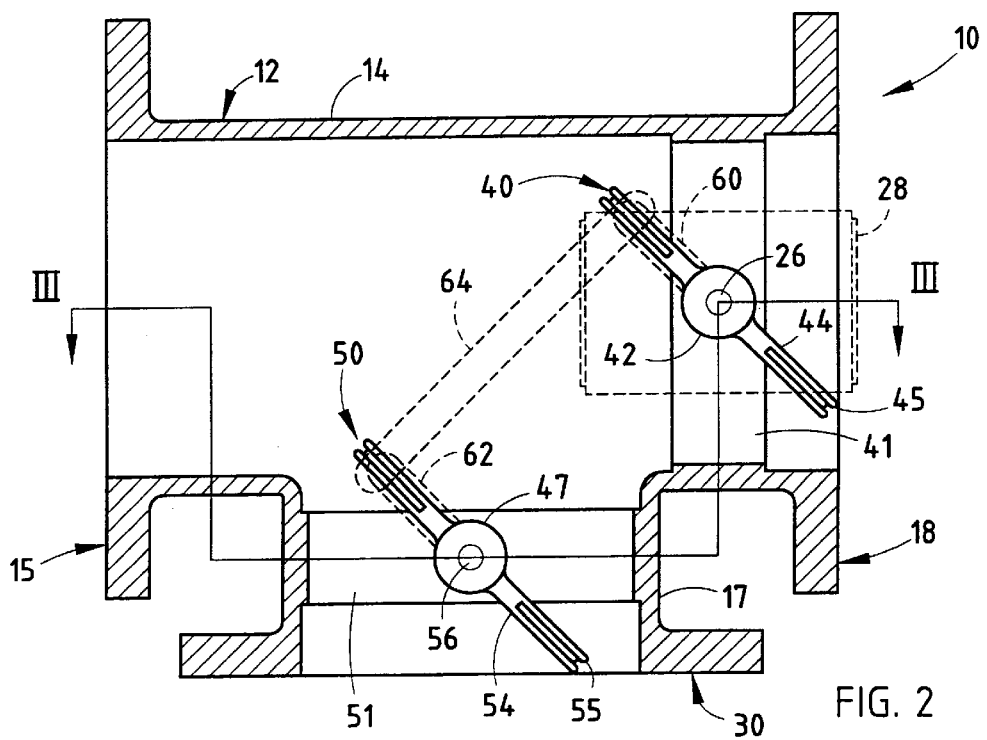
FIG. 2 is a top, cross-sectional view of the valve assembly shown in FIG. 1, shown partly in phantom form.
Figure 3:
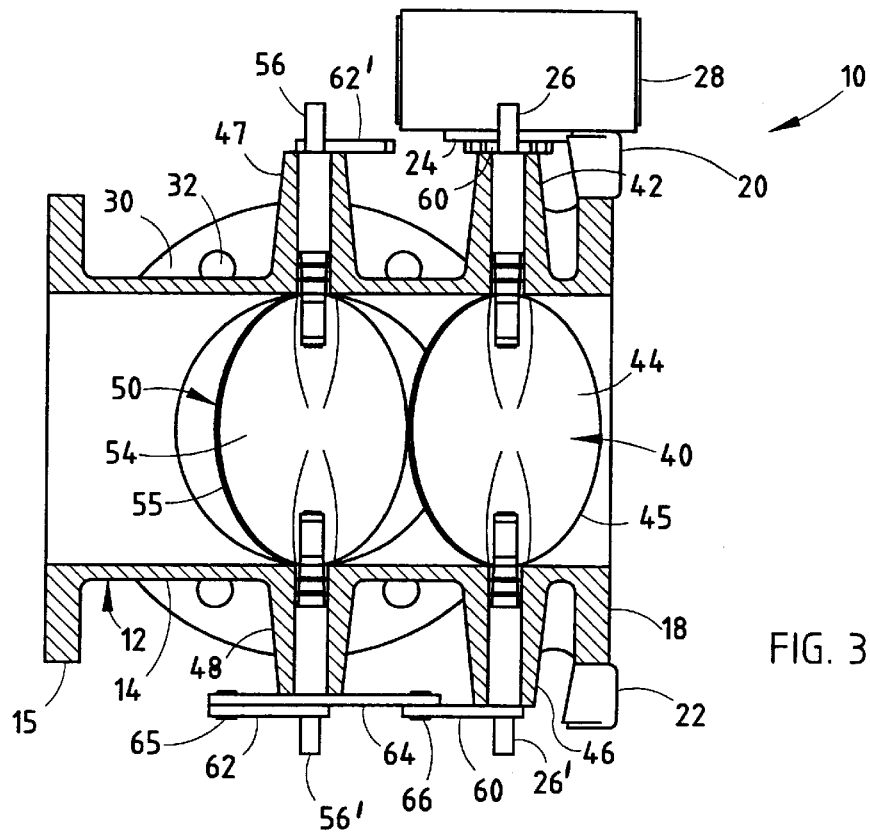
FIG. 3 is a front, cross-sectional view of the valve shown in FIGS. 1 and 2.

Associated with butterfly valve assembly 40 and as best seen in FIG. 3, housing 12 includes an upper generally cylindrical mounting boss 42 for receiving valve stem 26 sealably and rotatably mounted within boss 42 and coupled to an upper edge of valve disk 44. Disk 44 can be of conventional construction, including a double sealing edge 45 at the periphery, as best seen in FIG. 2. Housing 12 also includes a lower cylindrical mounting boss 46 for receiving valve stem 26', which is sealably and rotatably mounted in the cylindrical mounting boss 46 and is coupled to a lower edge of valve disk 44 of valve assembly 40 for controlling the rotation. Either of the keyed valve stems 26 or 26' can be employed for the rotation of valve disk 44 between open and closed positions or intermediate positions as discussed in greater detail below. The stems 26, 26' are mounted within bosses 42, 46, respectively, and to disk 44 in a conventional manner to allow the rotation of the disk while maintaining a seal around the stems.

Similarly, valve assembly 50 includes a valve disk 54 with a valve stem 56 extending upwardly through mounting boss 47 integrally formed in body 17. Stem 56 is coupled to one edge of valve disk 54 which includes an outer peripheral seal 55. Valve stem 56 sealably and rotatably extends through mounting boss 47, as best seen in FIGS. 1 and 3. A second mounting boss 48 sealably and rotatably receives a second valve stem 56' which is sealably and rotatably mounted within mounting boss 48 and is coupled to the lower edge of valve disk 54 such that either valve stem 56 or 56' can be employed to control the valve disk 54. In the embodiment shown in FIGS. 1–3, keyed valve stems 26' and 56' each include a control arm 60 and 62, respectively, extending therefrom and which are coupled to one another by a connecting link 64 and fasteners 65 and 66 (FIG. 3), such as threaded bolts, rivets or the like, allowing the synchronous motion of shafts 26' and 56' upon actuation of either of shafts 26 or 56 on the opposite side of valve housing 12. In the embodiments of FIGS. 1–3, valve stem 56 includes a pointer arm 62' for indicating the position of valve disk 54 while the actuator 28 is mounted to shaft 26 employing integral mounting boss 20 and plate 24 coupled to bosses 20 and 42 using conventional fastening techniques.

Figure 4:
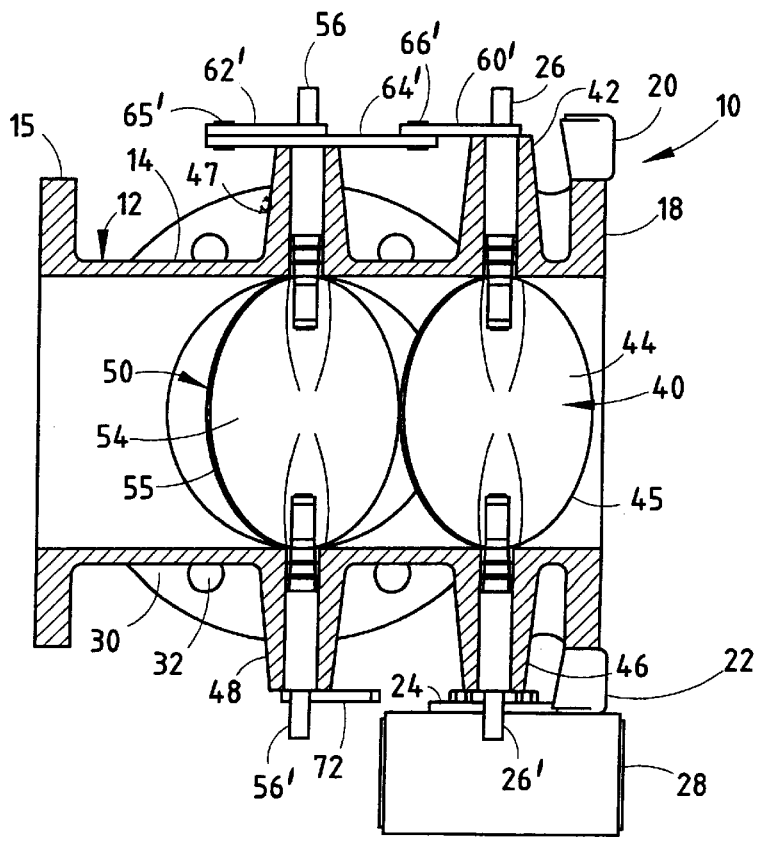
FIG. 4 is a vertical, cross-sectional view of the valve shown in FIGS. 1–3, with the actuator and linkage mechanism coupled in a left hand mounting configuration.

In some applications, it may be desired to mount the valve actuator on the opposite side of housing 12 of valve assembly 10. The extension of valve stems 26, 26' from opposite sides of housing 12 and 56, 56' associated with valve assembly 50 on opposite sides of the housing permits such use. As seen in FIG. 4, the actuator 28 is mounted to valve stem 26' on the lower side of valve housing 12, while a pointer 72 is mounted to valve stem 56'. The interconnecting links 62', 64', and 60' are coupled to the valve stems 26, 56 as seen in FIG. 4 such that the controlled actuator 28 coupled to keyed shaft 26' will actuate both valve disks 44 and 54 synchronously. In FIG. 4, the valve assembly is shown in the same configuration as that of FIG. 3. It is understood that the valves can also be reversed from end to end and actuator 28 can be mounted to either of the mounting bosses 20 or 22 for coupling to shaft 26 or 26', respectively. Similarly, flange 30 could include an actuator mount or mounts such that the actuator could be coupled to either shaft 56 or 56'.

The valve disks 44 and 54 can be made of a conventional aluminum bronze alloy or ductile iron, which is EDPM or BUNA coated, or other suitable material typically employed for butterfly valve disks. The valve stems 26, 26' and 56, 56' are typically made of high strength 416 stainless steel. The housing 12 of the three-way butterfly valve 10 of the present invention can be coated on the inside and out with a polyamide coating to provide corrosion resistance for most applications and may have an internal diameter of from 2" to 12", depending on the application for which the valve is to be employed. By extending the valve stems for the butterfly valve assemblies 40 and 50 through mounting bosses formed on opposite sides of housing 12, the valve actuator can be mounted to either side and on either valve stem with the interconnecting linkage mounted to the opposite side, such that a universal left or right side valve is provided.

Thus, with the valve of the present invention, a universal flanged three-way butterfly valve is provided which allows for the operation of the valve from either side. Although the valve assemblies 40 and 50 are shown mounted in ports associated with flanges 18 and 30, it can be appreciated that the housing 12 can be manufactured to provide valves in a different pair of ports. Similarly, the valves are shown in a partially open/closed position, it being understood that conventionally they can be fully opened, fully closed or in any partially opened or closed position.

It will become apparent to those skilled in the art that various modifications to the preferred embodiment of the invention as described herein can be made without departing from the spirit or scope of the invention as defined by the appended claims.

What is claimed is:

1. A three-way flanged butterfly valve comprising:
    a valve housing including a first port, a second port and a third port;
    a pair of butterfly valves mounted within said housing in two of said first, second, and third ports; and
    said butterfly valves including valve stems which extend from opposite sides of said housing such that a valve can be actuated from either side of said housing and said valves can be coupled together at one side of said housing and actuated from an opposite side of said housing.

2. The valve as defined in claim 1 wherein said housing integrally includes valve stem mounting bosses for supporting each of said valve stems.

3. The valve as defined in claim 2 wherein said housing integrally includes mounting flanges for each port and wherein at least one of said flanges includes a mounting boss for mounting a valve actuator thereto.

4. The valve as defined in claim 3 wherein said at least one flange includes a mounting boss extending from opposite sides to allow mounting of a valve actuator on either side of said housing.

5. The valve as defined in claim 4 wherein said housing is generally T-shaped.

6. The valve as defined in claim 5 and further including links coupling valve stems on one side of said housing for effecting simultaneous movement of said butterfly valves.

7. A multiple flange butterfly valve comprising:
    a valve housing defining first, second, and third ports, wherein said housing includes a mounting flange surrounding each port;
    at least two butterfly valve assemblies mounted within said housing to selectively obstruct two of said first, second, and third ports; and
    valve stems extending to each of said butterfly valve assemblies through said housing from opposite sides of said housing to allow interconnecting of first and second valve stems on one side of said housing and actuation of said valves from an opposite side of said housing.

8. The valve as defined in claim 7 wherein said housing integrally includes mounting flanges for each port and wherein at least one of said flanges includes a mounting boss for mounting a valve actuator thereto.

9. The valve as defined in claim 8 wherein said at least one flange includes a mounting boss extending from opposite sides for mounting of a valve actuator on either side of said housing.

10. The valve as defined in claim 7 wherein said housing integrally includes valve stem mounting bosses for supporting each of said valve stems.

11. The valve as defined in claim 7 wherein said housing is generally T-shaped.

12. The valve as defined in claim 7 and further including links coupling valve stems on one side of said housing for effecting simultaneous movement of said butterfly valves.

13. A multiple flange butterfly valve comprising:
    a valve housing defining at least first, second, and third ports, wherein said housing includes a mounting flange surrounding each port;
    a mounting boss on opposite sides of at least one of said flanges for receiving an actuator for a valve;
    at least two butterfly valve assemblies mounted within said housing to selectively obstruct two of said first, second, and third ports, wherein one of said valve assemblies is proximate said at least one flange; and
    valve stems extending to said butterfly valve assemblies through said housing from opposite sides of said housing to allow interconnecting of said valve stems on one side of said housing and actuation of said valves from an opposite side of said housing.

14. The valve as defined in claim 13 wherein said housing integrally includes valve stem mounting bosses for supporting each of said valve stems.

15. The valve as defined in claim 14 wherein said housing is generally T-shaped.

16. The valve as defined in claim 15 and further including links coupling valve stems on one side of said housing for effecting simultaneous movement of said butterfly valves.

17. A three-way flanged butterfly valve comprising:

a valve housing defining a first cylindrical port, a second cylindrical port and a third cylindrical port, with each of said ports intersecting one another;

butterfly valve assemblies mounted within said housing in two of said first, second, and third ports; and said butterfly valve assemblies each including valve stems which extend in opposite directions through said housing such that a valve disk associated with each valve assembly can be actuated from opposite sides of said housing and said valve stems can be linked together at one side of said housing and actuated from an opposite side of said housing.

18. The valve as defined in claim 17 wherein said housing integrally includes valve stem mounting bosses for supporting each of said valve stems.

19. The valve as defined in claim 18 wherein said housing integrally includes mounting flanges for each port and wherein at least one of said flanges includes a mounting boss extending from opposite sides to allow mounting of a valve actuator on either side of said housing.

20. The valve as defined in claim 19 wherein said housing is generally T-shaped.

21. The valve as defined in claim 20 and further including links coupling valve stems on one side of said housing for effecting simultaneous movement of said disks.

* * * * *